United States Patent [19]

Turner

[11] 4,300,097
[45] Nov. 10, 1981

[54] INDUCTION BALANCE METAL DETECTOR WITH FERROUS AND NON-FERROUS METAL IDENTIFICATION

[75] Inventor: John E. Turner, El Paso, Tex.
[73] Assignee: Techna, Inc., El Paso, Tex.
[21] Appl. No.: 62,237
[22] Filed: Jul. 27, 1979
[51] Int. Cl.³ .................. G01V 3/11; G01V 3/165
[52] U.S. Cl. .............................. 324/329; 324/233
[58] Field of Search ............... 324/326, 334, 329, 339, 324/233

[56] References Cited

U.S. PATENT DOCUMENTS

| | | | |
|---|---|---|---|
| 3,020,470 | 2/1962 | Shawhan et al. | 324/329 |
| 3,065,407 | 11/1962 | Huddleston et al. | 324/339 |
| 3,112,443 | 11/1963 | Buckner | 324/339 |
| 3,614,600 | 10/1971 | Ronka | 324/330 |
| 3,676,772 | 7/1972 | Lee | 324/233 |
| 3,826,973 | 7/1974 | Pflaum | 324/233 X |
| 3,872,380 | 3/1975 | Gardiner | 324/329 |
| 4,024,468 | 5/1977 | Hirschi | 324/329 |
| 4,030,026 | 6/1977 | Payne | 324/329 |
| 4,099,116 | 7/1978 | Tyndall | 324/329 |
| 4,128,803 | 12/1978 | Payne | 324/329 |

FOREIGN PATENT DOCUMENTS 480447  1/1952  Canada .............................. 324/329

OTHER PUBLICATIONS

LeGaye, E. S., "The Electronic Metal Detector Handbook . . . ", Western Heritage Press, Sep. 1969, pp. 93-96.

*Primary Examiner*—Gerard R. Strecker
*Attorney, Agent, or Firm*—Harvey B. Jacobson

[57] ABSTRACT

An induction balance metal detector circuit includes a receiver coil output which is connected to one input of a unique phase detector circuit. The reference transmitter coil signal is connected to a second input of the phase detector. The phase detector comprises circuitry which provides an output equal to the smaller of the two input signals. The output is doubled and integrated, then compared to a current indicative of the integrated reference signal in a differential amplifier. The output of the differential amplifier is passed through a dead band and used to excite a first indicator in response to phase difference between the inputs to the phase detector indicative of the location of ferrous metals. A second indicator is excited in the event the phase difference indicates the presence of non-ferrous metals. A balance and threshold control is established between the transmitter and the receiver coils in order to adjust the phase and amplitude of the received signal. A feedback loop is established between the ferrous metal output and the threshold and the balance control. The ferrous metal output is integrated to provide an indication of mineralized soil in the environment. This integrated output is utilized to change the impedance at the receiver coil in order to null out the effects of the mineralized soil. The circuitry is adapted for use in integrated circuit form.

5 Claims, 4 Drawing Figures

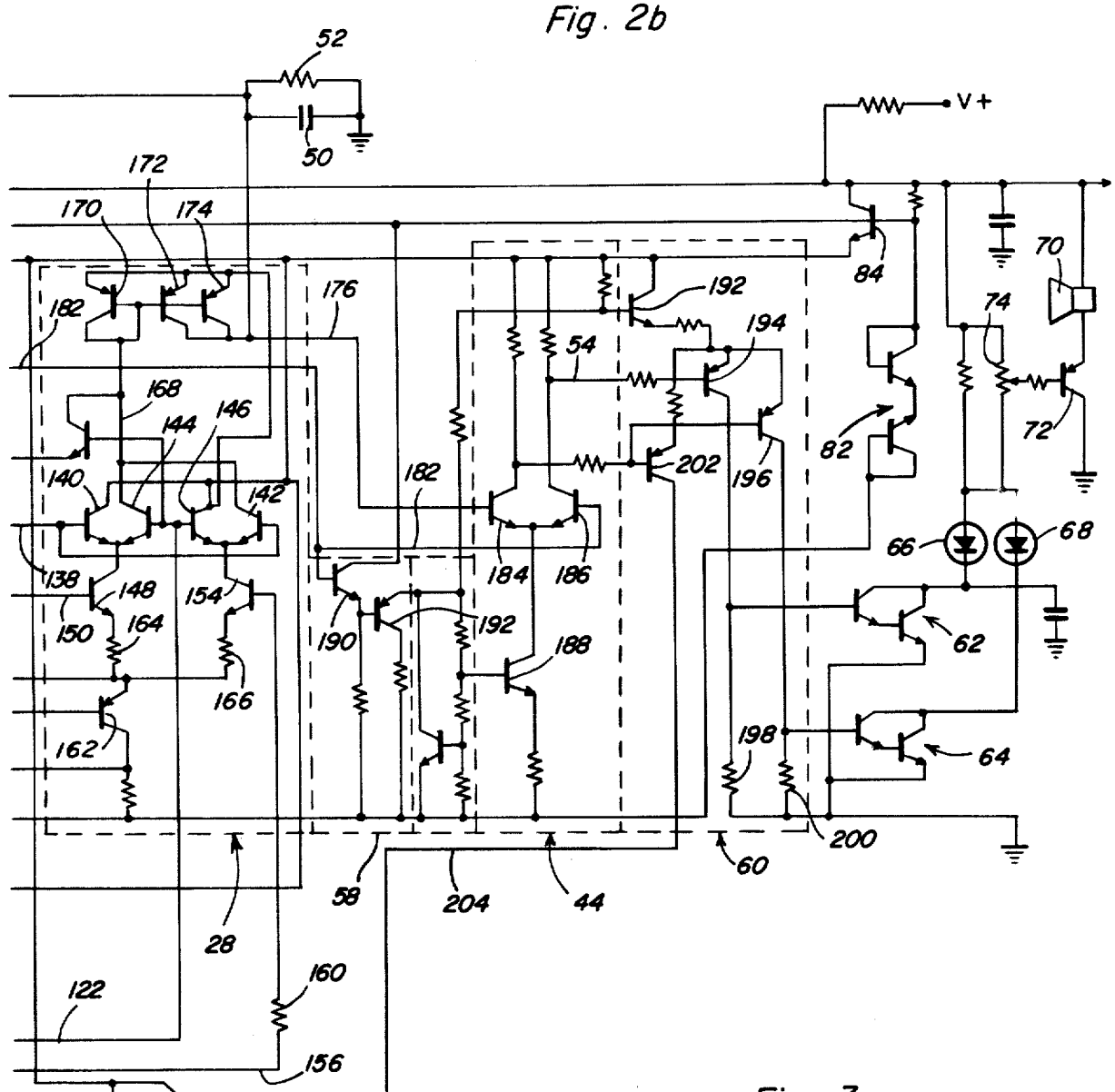

INDUCTION BALANCE METAL DETECTOR WITH FERROUS AND NON-FERROUS METAL IDENTIFICATION

BACKGROUND OF THE INVENTION

1. Field of the Invention

This invention relates to metal detectors of the induction balance type and especially to such metal detectors which have the ability to discriminate between ferrous and non-ferrous metal objects and also which have the ability to compensate for ground effects caused by the presence of mineralized soil.

2. Discussion of Related Art

The use of metal detectors in searching for valuable objects has increased considerably in recent years, both as a hobby and as a serious means of finding relics from the past, etc. This demand has resulted in the development of the induction balance metal detector to a very sophisticated level. The induction balance detector is provided with a transmitter coil and a receiver coil. The transmitter coil radiates an alternating signal of a predetermined frequency which induces a current in the receiver coil. When a metallic element is disposed in the field of the transmitter coil, its presence causes a variation in the coupling between the transmitter and receiver coils and, accordingly, the received signal changes in both amplitude and phase. This change in the received signal is utilized to provided an indication of a metallic substance within the transmitter field.

One difficulty with induction balance metal detectors exists when such detectors are used in areas containing magnetite and other conductive minerals in the soil. These elements cause unwanted amplitude and phase changes in the received signal which can result in either false indications being made by the detector or the absence of indications when valuable objects are in the vicinity. It is possible to provide a coupling between the transmitted and received signals in order to null out these "ground effects". Examples of such nulling circuits include that shown in U.S. Pat. No. 4,099,116, issued July 4, 1978, to Tyndall. The Tyndall detector includes an impedance network connected between the transmitter and the received coils which phase relates the transmitted and received signals in order to vary the amplitude and phase of the received signal so that the ground effect signals can be nullified. Such devices are effective but are plagued with the inevitable need to be constantly retuned as the mineral content of the soil being traversed changes. U.S. Pat. No. 4,024,468, issued May 17, 1977, to Hirschi, includes a tuning control and trimmer capacitor which are set to provide a tuning signal of the same phase angle as a residual received signal produced by magnetic mineral soil in order to nullify that signal. Again, in order to be effective, the Herschi control would need to be constantly adjusted in order to continuously compensate for changes in soil composition.

A further difficulty encountered with early induction balance metal detectors was the lack of ability to distinguish between precious metals and "junk" metals. These latter consisting of pull tabs, foil, tin cans, etc. It is, however, known that such "junk" materials can be distinguished from precious metals such as gold, silver and copper by the differences in phase and amplitude of the received signal. Circuits have been suggested which attempt to capitalize upon these variations. For instance, U.S. Pat. No. 3,826,973, issued July 30, 1974, to Pflaum, shows a metal detector wherein in response to a first phase relationship between the excited coil voltage and the pickup coil voltage, and an aural tone of a first, predetermined frequency is derived to indicate detection of a ferrous body. In response to a conductive body being in the magnetic field between the excitation and pickup coils, the resulting phase displacement causes the frequency of the oral tone to shft from the frequency associated with the detection of a ferrous body. U.S. Pat. No. 3,872,380, issued March 18, 1975, to Gardiner, shows a metal detector wherein the detected signal is applied to a wave shaping circuit to derive short duration pulses which trigger a flip-flop. The transmitted signal is applied to a phase shifter and a wave shaping circuit for application to the same flip-flop. The output of the flip-flop is applied to an indicator circuit containing a meter. The meter is maintained mid scale during quiescent conditions and is deflected one way or the other depending on the phase relationship of the signals actuating the flip-flop. The above-mentioned U.S. Pat. No. 4,099,116, to Tyndall, also contains a discriminator capability. Feedback from the transmitter coil to the receiver coil is used to adjust the phase relationships thereof and thereby null out received signals indicative of junk materials. Also, the above-mentioned U.S. Pat. No. 4,014,468, to Hirschi, contains a discriminating control. This control changes the phase of the residual output signal of the received coil to set the quiescent operating point at a selected angle between about 0 and $-90°$ relative to the component of the received coil signal produced by the presence of magnetic mineral soil, and a tuning control adjusts the amplitude of the residual signal to an audio threshold level. As a result, amplitude differences in the received component can be used to discriminate between objects located by the meter detector.

SUMMARY OF THE INVENTION

One object of the present invention is to provide an induction balance metal detector which utilizes a phase and amplitude sensitive detector circuit for providing an indication of the type of material being sensed by the metal detector.

A further object of the present invention is to provide an induction balance metal detector having a discriminator which produces two separate outputs, one output being indicative of non-ferrous metals and the other output being indicative of ferrous metals.

A still further object of the present invention is to provide an induction balance metal detector wherein the ferrous output can be selectively disconnected to provide indications of the presence of non-ferrous metals only or can be selectively connected to provide an output indicative of the presence of both non-ferrous and ferrous elements.

Another still further object of the present invention is to provide an induction balance metal detector having a ground effect compensation circuit for nulling the effects of mineralized soil present within the operating field of the metal detector by the use of a feedback circuit extending from the ferrous output of the discriminator circuit in order to provide automatic compensation for changing soil content.

One still further object of the present invention is to provide an induction balance metal detector having a tuning control which can be set in a first position for providing ferrous and non-ferrous metal indications or can be set in a second position wherein all metals are detected and activate the non-ferrous output.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 2a and 2b constitute a detailed schematic diagram of the circuitry of the metal detector of the present invention.

FIG. 3 is a graph illustrating the operation of the detector.

DESCRIPTION OF THE PREFERRED EMBODIMENT

Figure 1:
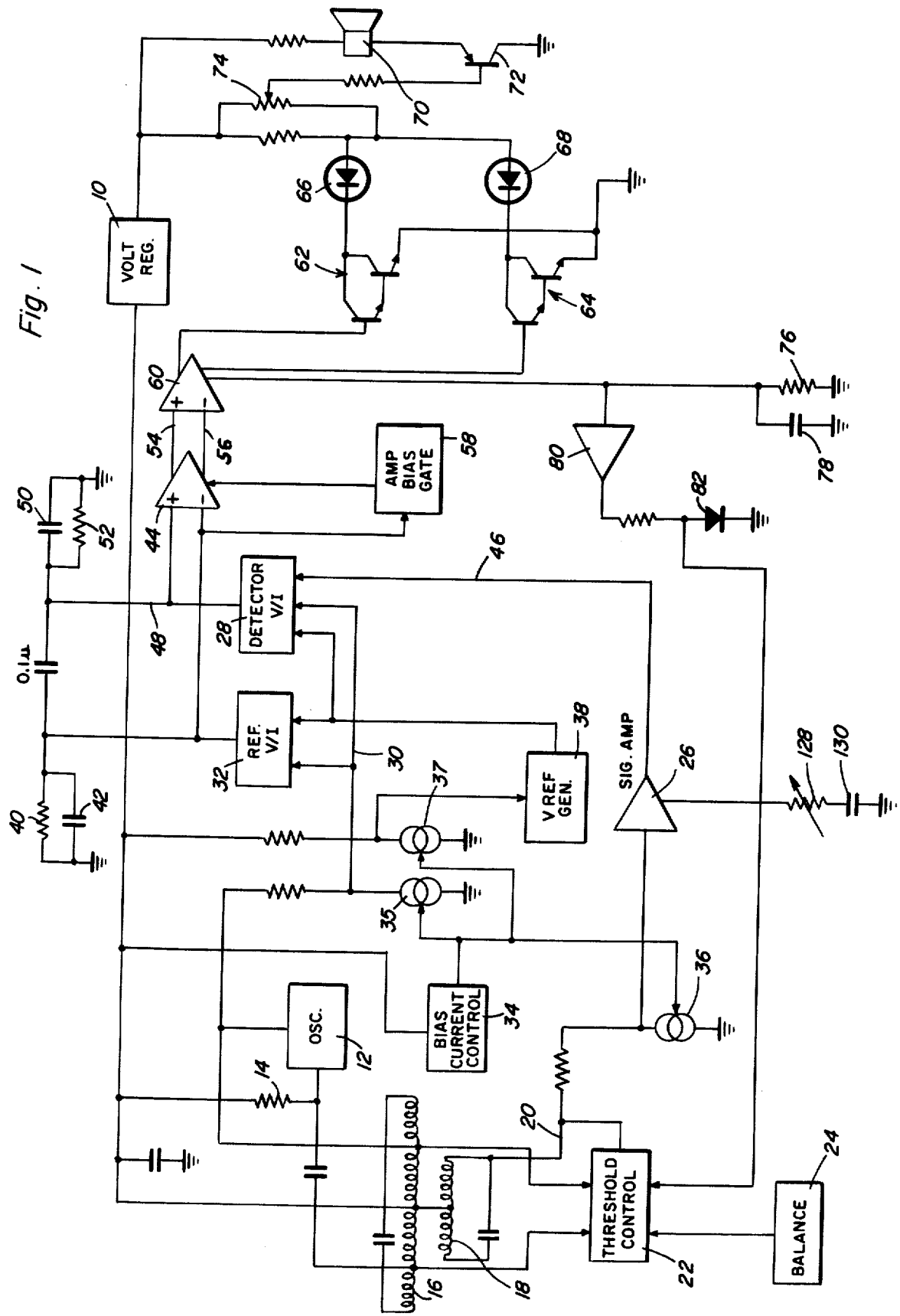
FIG. 1 is a block diagram of the metal detector of the present invention.

Now with reference to the drawings, an induction balance metal detector incorporating the principles and concepts of the present invention will be described in detail. With particular reference in FIG. 1, it will be seen that the detector circuitry comprises a voltage regulator 10 which supplies a controlled voltage through resistor 14 to oscillator 12. Oscillator 12 provides a pulsed signal to transmit coil 16, the center tap of which is directly connected to the voltage supply through regulator 10. Receive coil 18 receives its stimulus from primary coil 16 through transformer action. The received signal is transmitted through line 20 where it is combined with signals received from the threshold control 22 and the balance control 24. That combined output is channeled through signal amplifier 26 to the detector 28. A second input to that detector is an oscillator voltage from oscillator 12 supplied through line 30. That oscillator reference voltage is also supplied to a reference voltage to current converter 32.

A control current is established in bias current control 34 and is mirrored through current mirrors 35, 36 and 37 to provide identical dc level shifts to the oscillator reference signal on line 30, the sensor signal input to the signal amp 26 and to voltage reference generator 38. Voltage reference generator 38 provides voltage reference points to the reference voltage, the current converter 32 and the detector 28.

Current converter 32 converts the positive halves of the oscillator reference signal received from line 30 into current pulses which are integrated in the integration network comprising resistor 40 and capacitor 42. These integrated positive half waves are presented to one input of a first differential amplifier 44.

Detector 28 compares the reference input received on line 30 with the sensor signal received on line 46 from signal amplifier 26. Both these signals are also compared with a threshold voltage and if both signals are above the threshold voltage, an output is produced. If the reference signal is greater than the sensor signal, the reference signal is outputted on output line 48. If the sensor signal is greater than the reference signal, it is outputted on line 48. If the reference and sensor signals are equal, the output on line 48 is equivalent to the addition of one-half the value of each of these signals. Prior to outputting the correct signal, detector 28 converts the voltage to a current output and doubles the current value. This output is finally integrated via the network comprising capacitor 50 and resistor 52 and presented to the second input of differential amplifier 44. Accordingly, the signal on line 48 is dependent upon the phase difference and amplitude of the oscillator reference and sensor signals. Thus, with constant amplitude, the integrated output current varies in opposition to the phase difference of the signals.

Comparing the integrated output of the detector 28 with the integrated output of reference converter 32 results in a signal on line 54 if the sensor signal leads the reference signal plus 90° thus indicating the presence of non-ferrous metals. An output on line 56 results if the sensor signal lags the reference signal plus 90° thereby indicating ferrous metal.

An amplifier bias gate 58 also receives the output of reference voltage to current converter 32 and allows the differential amplifier 44 to be active only if the output from the reference converter 32 is above a predetermined minimum. Thus, if no reference signal is available, no output from the device will be produced.

Outputs 54 and 56 are connected to a second differential amplifier 60 which drives Darlington pair 62 and 64. The differential amplifier 60 is biased so as to produce a slight dead band to insure an accurate reading. Darlington pair 62 is used to drive LED 66 to indicate the presence of non-ferrous material. In like manner, Darlington pair 64 is used to drive LED 68 which indicates the presence of ferrous material. If either Darlington pair is active, the current drawn therethrough operates an audible signal 70 through transistor 72 and the volume control 74.

A ferrous output from differential amplifier 60 is integrated in the network comprising resistor 76 and capacitor 78. This integrated signal is amplified in amplifier 80 and forward biases the diode 82 by means of the network comprising resistor 76 and capacitor 78 to vary the impedance of diode 82. The variable impedance of diode 82 is presented to the received signal on line 20 through threshold control 22 and causes variation of the phase and amplitude of that signal thereby providing automatic ground source compensation by nulling out the effects of mineralized soil.

Figure 2A:
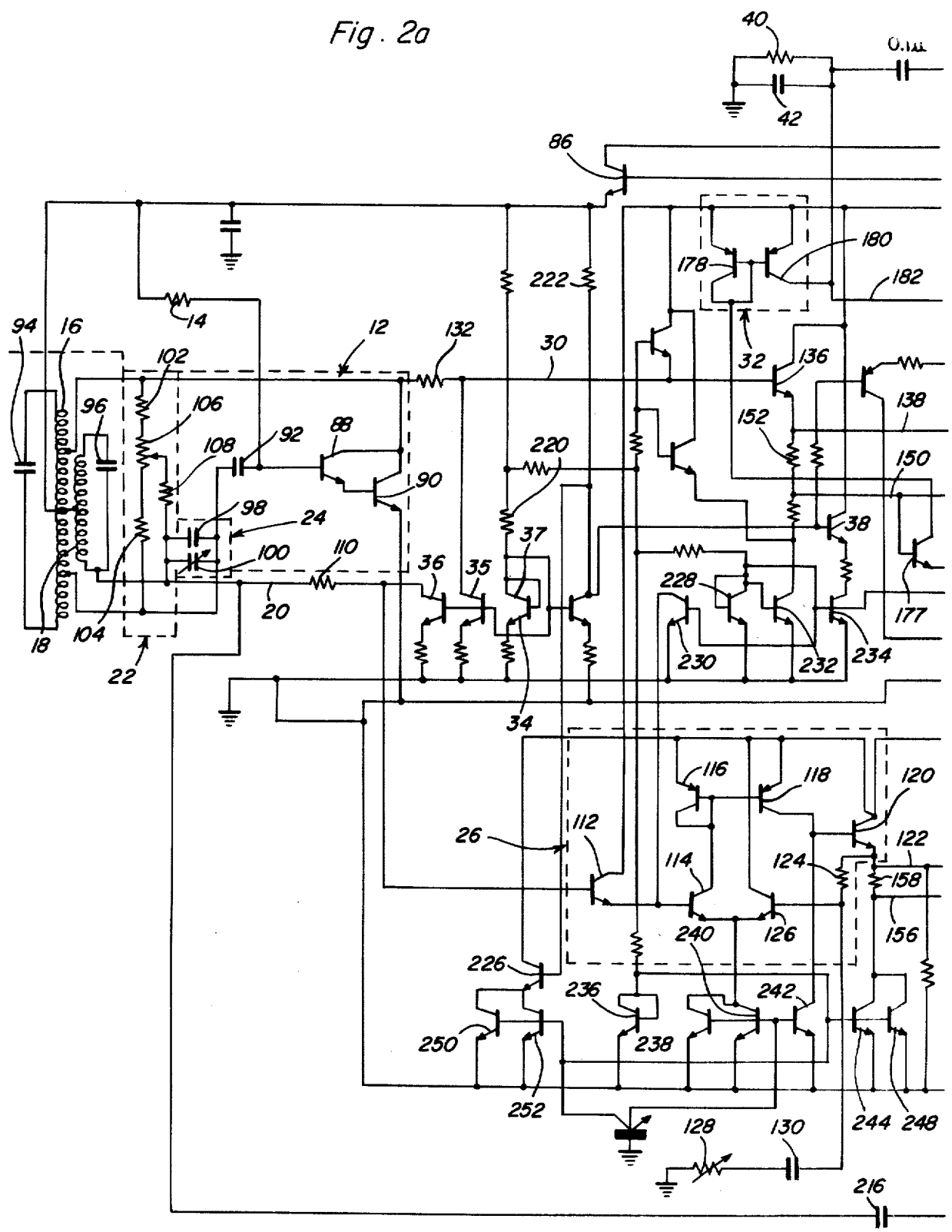

Now with reference to FIGS. 2a and 2b, a detailed schematic of the circuitry of the present invention will be described. It should be noted that as set forth, the schematic of FIGS. 2a and 2b is, for the most part, amenable to manufacture by integrated circuit techniques, a would be obvious to one of ordinary skill in the art.

Initially, it will be seen that the voltage regulator 10 is in the form of a simple zener referenced regulator including zener diode 82 which feeds the circuit through pass transistor 84. A separate pass transistor 82 feeds the sensor portion, the oscillator and the bias network in order to keep cross talk at a minimum.

The oscillator 12 is a blocking oscillator which includes a transistor pair 88, 90 which are biased on through resistor 14 which is connected to the output of transistor 86. Current is drawn by the transistor pair from coil 16 which, through transformer action, raises the base potential of transistor 88 through capacitor 92 to saturate the pair. This causes capacitor 92 to be charged to a potential of approximately half the regulated supply voltage. During this time, transmitter coil 16 together with capacitor 94 which form a tank circuit ring at the desired transmitter frequency. When the transistors 88 and 90 are fully saturated, the transformer action ceases and capacitor 90 causes the base of transistor 88 to be negatively biased thereby shutting off the transistor 88, 90 until capacitor 92 is discharged sufficiently through resistor 14 to raise the base potential of transistor 88 again. This cycle continues to repeat itself.

The sensing loop comprising received coil 18 and capacitor 96 receives its stimulus from the primary loop comprising transmit coil 16 and transmit capacitor 94 through transformer action and oscillates accordingly. The signal from it is carried through line 20 and is combined with two other signals originating with the primary loop. Parallel connected capacitors 98 and 100 which comprise the balance control 24 connect a capacitively coupled reference signal from the lower portion of transmit coil 16 to line 20. Capacitor 98 has a value of 50 pf. while capacitor 100 is variable between 5 and 80 pf. Resistors 102 and 104 which are in series with potentiometer 106 are connected between the upper and lower connections of the oscillator to transmitter coil 16. The wiper of potentiometer 106 is connected through 17 k ohm resistor 108 and resistively couples an oscillator reference signal of variable phase to line 20. Resistors 102, 104, 106 and 108 constitute the threshold balance control which controls the resultant phase angle of the signal on line 20 and therefore the degree to which the circuit is capable of distinguishing between ferrous and non-ferrous metals by moving the operating threshold point thereof.

The sensor signal on line 20 is passed through resistor 110 to the signal amplifier 26 which is a dc coupled differential amplifier with an emitter follower output. The signal is buffered in transistor 112 and brought to the non-inverting input which is the base of transistor 114. The output which is taken through diode 116 is mirrored through transistor 118 is passed to output transistor 120 and finally passed through the emitter of that transistor to output line 122. The output is internally brought back through resistor 124 which has a value of 16.2 k ohm to the inverting input which is the base of transistor 126. The gain of the amplifier is controlled by variable resistor 128 which is connected through capacitor 130 to the base of transistor 126. The output on line 122 is then one input to the detector 28.

The oscillator reference signal is taken through resistor 132 along line 30 and into the base of buffer transistor 136. The output is taken from the emitter of transistor 136 along line 138. The signal travelling along line 138 constitutes a second input to the detector 28.

The oscillator reference input signal to detector 28 on line 138 is connected to the bases of transistors 140 and 142 while the sensor signal input on line 122 is connected to the bases of transistors 144 and 146. The emitters of transistors 140 and 144 are connected to transistors 148 whose base is controlled through line 150 by a level shifted oscillator reference signal taken from the emitter of transistors 136 and biased approximately 100 millivolts below the bases of transistors 140 and 144 through the use of biasing resistor 152 which has a value of approximately 450 ohms. In a similar manner, the emitters of transistors 142 and 146 are connected to transistors 154 whose base input is taken through line 156 and is maintained at approximately 100 millivolts below the bases of transistors 142 and 146 by resistor 158 which is connected to the emitter transistor 120 and also has a value of approximately 450 ohms. A 250 ohm input resistor 160 is also connected in line 156 in series with the base of transistor 154. The lower transistors 148, 154 as the emitter followers determine the output current. The upper transistor pair connected to each lower transistor acts to steer the output current to the appropriate output. Biasing the lower transistors by 100 millivolts below the input voltage prevents saturation of the lower transistors even when both inputs have equal voltage. Transistors 162 whose emitter is connected through 1.8 k ohm resistors 164 and 166, respectively, to transistors 148 and 154 establishes the operating threshold voltage for the detector. The output from the detector is taken through line 168 which is connected to the collectors of transistors 142 and 144. The collectors of transistors 140 and 146 are connected directly to the supply and shunt current away from the detector output. The output along line 168 is passed through a current mirror comprising diode 170, the current through which is mirrored into transistors 172 and 174 and doubled thereby producing on line 176 a final output current which is twice that of the output current on line 168. The output on line 176 eventually becomes one of the inputs to amplifier 44.

The operation of detector 28 can be broken down into three operating conditions. These will be explained with reference to FIG. 3. In FIG. 3, Vsen represents the sensor signal input on line 122, Vref represents the reference signal on line 138. Vthr represents the threshold voltage which is the voltage at the emitter of transistor 162 and $\Delta V$ represents the base to emitter voltage of transistor 148 and 154 together with the 100 millivolt incremental drop in the bias level of the bases of these transister as discussed above.

The three operating conditions are:

Condition 1: $Vref > Vsen > Vthr + \Delta V$

In this case the shaded area in FIG. 3 labelled Condition 1 applies and transistors 140 and 142 will be turned on. The current from these transistors, which is equal to the emitter voltage of transistor 148 minus the emitter voltage of transistor 162 divided by 1.8 k ohms is shunted to the supply. The detector output is determined by transistor 154 and is equal to the emitter voltage of transistor 154 minus the emitter voltage of transistor 162 divided by 1.8 k ohms. This current is multiplied by 2 in the current mirror comprising 170, 172 and 174 and finally outputted on line 48.

Condition 2: $Vsen > Vref > Vthr + \Delta V$

This condition is analogous to Condition 1 with the detector output current being the current through transistor 148, the current through transistor 154 being shunted to the supply.

Condition 3: $Vsen = Vref > Vthr + \Delta V$

In this case, the output current equals half the current through transistor 148 plus half the current through transistor 154.

From the foregoing, it can be seen that the output current of the detector is proportional to the shaded area under one of the signal curves Vsen and Vref of the graph of FIG. 3, depending on the phase and the amplitude of both input signals. The amplifier current on line 48 is integrated through a network consisting of capacitor 50 and resistor 52. Thus, with constant amplitude, the integrated output current varies in opposite to the phase difference. This integrated output on line 48 is then one input to differential amplifier 44.

The oscillator reference signal on line 150 is also passed through input transistor 177 and through the collector of the transistor to voltage to current converter 32. Converter 32 merely comprises a current mirror with the current through transistor 178 being mirrored into the collector 180 of transistor 176. Transistor 176 passes only the positive half waves of the oscillator reference signal and after being converted to current pulses, there are integrated in the network comprising capacitor 42 and resistor 40. The integrated oscillator reference output pulses are passed along line 182 and comprise the second input to differential amplifier 44. Amplifier 44 is a straight forward differential pair comprising transistors 184, 186 and 188 and their associated bias resistors. The integrated reference pulses and also applied to amplifier bias gate 58 is used to keep transistor 190 active when the input on line 48 is greater than 1.4 v. If the integrated oscillator reference falls below this value, transistor 192 is turned on and shunts the bias current from the current source transistor 188 of the amplifier 44 to ground. The output of amplifier 44 are on lines 54 and 56 which constitute the inputs to differential amplifier 60. Amplifier 60 is comprised of current source transistor 193 together with transistors 194 and 196. These constitute a PNP differential amplifier wherein the emitters are biased at 1 Vbe below supply to shut off its output if the inputs to amplifier 44 are balanced. This creates a dead band. This dead band is further enlarged by the 9 K ohm lead resistors 198 and 200 connected to transistors 194 and 196, in combination with a 1.5 Vbe turn on threshold of the Darlington LED drivers 62 and 64. The Darlington drivers 62 and 64 cause the illumination of, respectively, LEDs 66 and 68 which are indicative of the presence of non-ferrous and ferrous metals, respectively. When either of the diodes is illuminated, current is also drawn through volume control resistor 74 and driving transistor 72 to sound the audible alarm 70.

Feedback is derived from integrated current pulses through transistor 202 in synchronism with the output of amplifier 60 and brought through line 204 to an integrating network comprising resistor 76 and capacitor 78. The integrated signal is applied to Darlington pair amplifier 80 and is indicative of the presence of mineralized soil. The amplifier signal causes diode 82 to be forward biased with the current dependent upon the size of the signal, thus changing its effective impedance which is presented through 10 K ohm resistor 214 and 1500 pf. capacitor 216 to line 20. This impedance presented to line 20 causes the sensor signal phase and amplitude to change compensating for the presence of minerlized soil in the ground. The phase and amplitude change is dependent upon the level of the signal received through Darlington pair 210 and thus constantly shifts to compensate for varying soil conditions nulling out the component of the sensor signal which is due to these conditions.

A biasing network suitable for use in an integrated circuit is also included in the schematic. It consists of three current mirror blocks all energized from a common resistor chain. Block 1 includes transistors 35, 36, 37 and 34. Transistor 34 receives the control current through resistor 220 and mirrors it through transistors 35, 36 and 37 into resistors 132, 110 and 222 which are each 30 ohm resistors. This provides an identical dc level shift to the reference signal on line 30, the sensor signal on line 20 and also provides a voltage reference point at the base of transistor 224 and transistor 226.

A second block comprising transistors 228, 230, 232 and 234 keeps active the input transistors 136 and 112 and the volage reference transistor 38.

Block 3 comprising transistors 236, 238, 240, 242, 244, 248, 250 and 252 provide bias for the sensor signal amplifier 26 and also provide a load for the voltage reference output transistor 226.

Appropriate circuitry, as will be recognized by one of ordinary skill in the art, is also provided in appropriate connections to these blocks for maintaining bias levels at other points throughout the circuit.

In operation, with oscillator supplying a transmit signal to transmit coil 16, the balance control 24 is adjusted thereby changing the capacitance of capacitor 100 in order to balance the oscillator and the sensor signals until no output is heard in the absence of metal in the vicinity of the coils. The oscillator reference signal is passed to the reference converter 32 where the positive half waves are integrated and provided to amplifier 44. The sensor signal is amplified and provided as one input to detector 28 where it is compared with the oscillator reference signal as discussed above. The output of the detector is doubled and integrated and compared in differential amplifier 44 with the integrated oscillator reference signal. If a 90° phase difference exists between the two signals, no output is seen by the amplifier 60. If the integrated reference signal pulses are greater than the integrated output of the detector 28, this indicates the sensor signal leads the reference signal plus 90° and this indicates the presence of non-ferrous material. If the output of detector 28 is greater than the output of converter 32, this indicates that the sensor signal lags the reference plus 90° and accordingly indicates the presence of ferrous metal. These signals are appropriately passed through the amplifiers 62 and 64 to illuminate LEDs 66 and 68. Preferably, the output from amplifier 64 can be selectively disengaged from the diode 68 thereby allowing the user to eliminate an alarm indicating the presence of ferrous metals since non-ferrous metals are preferable. In this manner, with both LEDs connected, a ferrous and a non-ferrous mode of operation is established or, with the LED 68 disconnected from the circuit, a non-ferrous mode of operation can be established. Further, the threshold tuning control 22 can also be used to set different detection modes. With the potentiometer 106, which is a 5 k ohm potentiometer, rotated approximately 25%, the oscillator signal and receiver coil signal provide about a 4° phase difference between ferrous and non-ferrous metals. The detector 28 and amplifiers 44 and 60 activate the appropriate output based on this phase difference. With the potentiometer rotated approximately 75%, all metals are detected with no difference in phase of the receiver coil signal and the detector 28 with amplifiers 44 and 60 will activate only the non-ferrous output. Preferably, the tuner would be provided with stops in these two settings in order to easily alter the mode of operation.

Finally, when ferrous metals are detected, the use of integration network 76, 78 provides an indication that the ferrous output is due to mineralized soil and, through diode 82, compensates for the change in phase and amplitude of the sensor signal on line 20 caused by the mineralized soil.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. In an induction balance metal detector having a signal source supplying a reference signal for producing an electromagnetic field and a sensor responsive to said electromagnetic field for providing a signal phase shifted from the reference signal by metal in said field, phase detecting means connected to the sensor for producing a detector signal in response to metal in said field, and indicator means connected to the phase detecting means for identifying the metal as ferrous or non-ferrous, the improvement comprising signal input means connected to the phase detecting means for independently supplying the reference and sensor signals thereto with a predetermined phase difference in the absence of metal in the field, said phase detecting means including means for producing said detector signal as a function of either the reference signal or the sensor signal depending on the phase difference between and relative amplitudes of the reference and sensor signals, and means connected to the indicator means for comparing the detector signal with the reference signal to produce one of two metal identifying signals depending on the direction in which the reference and sensor signals deviate from said predetermined phase difference, said indicating means having two separate channels to which the two metal identifying signals are respectively fed.

2. The detector as defined in claim 1 wherein said predetermined phase difference is 90°.

3. The improvement as defined in claim 2 wherein the detector signal is a function of the sensor signal during the presence of ferrous metal in the field and is a function of the reference signal during the presence of non-ferrous metal in the field.

4. The improvement as defined in claim 3 including feedback means connected to one of the channels of the indicating means for transmitting the metal identifying signal as a function of the sensor signal during the presence of ferrous metal in the field, and threshold control means connecting the feedback means to the sensor for modifying the sensor signal to compensate for mineralized soil in the field.

5. The improvement as defined in claim 1 including feedback means connected to one of the channels of the indicating meansfor transmitting the metal identifying signal produced during the presence of ferrous metal in the field, and threshold control means connecting the feedback means to the sensor for modifying the sensor signal to compensate for mineralized soil in the field.

* * * * *